United States Patent [19]

Grossman

[11] Patent Number: 5,061,353
[45] Date of Patent: Oct. 29, 1991

[54] HIGH FEEDSTOCK UTILIZATION PHOTOCHEMICAL PROCESS FOR $^{196}$HG ENRICHMENT

[75] Inventor: Mark V. Grossman, Belmont, Mass.

[73] Assignee: GTE Products Corporation, Danvers, Mass.

[21] Appl. No.: 109,130

[22] Filed: Oct. 15, 1987

Related U.S. Application Data

[63] Continuation-in-part of Ser. No. 947,218, Dec. 29, 1986, abandoned.

[51] Int. Cl.$^5$ ............................................. B01D 5/00
[52] U.S. Cl. ......................... 204/157.22; 204/157.2; 204/157.21; 250/423 P
[58] Field of Search ........... 204/157.2, 157.21, 157.22; 250/423 P

[56] References Cited

U.S. PATENT DOCUMENTS

| | | | |
|---|---|---|---|
| 3,937,956 | 2/1976 | Lyon | 204/157.22 X |
| 3,983,019 | 9/1976 | Bergheaud | 204/157.21 |
| 4,097,384 | 6/1978 | Coleman et al. | 204/157.22 X |
| 4,374,252 | 4/1983 | Work et al. | 313/485 |
| 4,514,363 | 4/1985 | Dubrin | 204/157.22 X |
| 4,584,073 | 4/1986 | Lahoda et al. | 204/157.2 |
| 4,648,951 | 3/1987 | Maya | 204/157.22 X |

OTHER PUBLICATIONS

A. C. G. Mitchell et al., *Resonance Radiation and Excited Atoms*, chapter 4, "Collision Processes Involving Excited Atoms", MacMillen, N.Y. 1934, pp. 154–195.
C. R. Webster et al., "Photochemical Isotope Separation of Hg-196 by Reaction With Hydrogen Halides", J. Phys. Chem., 85, 1302 (1981).
M. Grossman et al., "Photochemical Enrichment of Hg-196", Thirteenth Int'l Quantum Electronic Conference (Jun. 1984).
H. E. Gunning et al., Adv. Photochemistry; 1, 248 (1963).
J. R. McDowell et al., "Photochemical Separation of Mercury Isotopes", Can. J. Chem., vol. 37, p. 1432 (1954).

*Primary Examiner*—Brooks H. Hunt
*Assistant Examiner*—Ngoclan T. Mai
*Attorney, Agent, or Firm*—Martha Ann Finnegan

[57] ABSTRACT

A photochemical process for $^{196}$Hg enrichment is provided. The process of the invention includes entraining mercury including $^{196}$Hg isotope in a carrier medium comprising argon and HCl; and exposing the entrained mercury including $^{196}$Hg isotope in the carrier medium to 253.7 nm light to form a quantity of $^{196}$Hg$_2$Cl$_2$. The present process results in an improved feedstock utilization.

5 Claims, 3 Drawing Sheets

HIGH FEEDSTOCK UTILIZATION PHOTOCHEMICAL PROCESS FOR $^{196}$HG ENRICHMENT

CROSS-REFERENCE TO RELATED APPLICATION

This application is a continuation-in-part application of Ser. No. 947,218 filed on 29 Dec. 1986, now abandoned.

BACKGROUND OF THE INVENTION

The present invention relates to a photochemical process and more particularly to a photochemical process for altering the isotopic composition of mercury.

The excitation of specific mercury isotopes by photochemical means is well known in the art. For example, the paper by Webster and Zare, "Photochemical Isotope Separation of $^{196}$Hg by Reaction with Hydrogen Halides" J. Phys. Chem. 85, 1302 (1981) discloses such excitation. Mercury vapor lamps are commonly used as an excitation source of mercury isotopes for specific photochemical reactions. To be successful, photochemical separation of a single isotope requires that the spectral band width of the exciting mercury radiation must be sufficiently narrow to excite only the isotope of interest. The specificity depends upon the spectral band width of the source. The rate and extent of separation of the particular isotope from the feed stock can be strongly dependent on the intensity of the radiation emitted from the mercury source.

A weakly ionized plasma of mercury and rare gases under low pressure, in the order of 1 to 3 torr, forms the basis of the fluorescent lamp. Electrical energy is converted to natural mercury resonance radiation at 253.7 nm. at an efficiency of 55 to 65%. This radiation, in fluorescent lamps, is converted to visible light by solid phosphors that are coated upon the lamp envelope. The efficiency of the 253.7 nm. resonance radiation emitted from excited mercury atoms in the plasma is reduced because the resonance radiation is absorbed and reemitted many times by ground state mercury atoms during its escape to the walls of the discharge tube. This trapping of resonance radiation prolongs the effective lifetime of the excited atoms and increases the opportunity for radiationless energy conversion which reduces efficiency.

It is known that the 253.7 nm. resonance line of mercury is composed of 5 hyperfine components, principally the result of isotope shifting. As is known, the $^{196}$Hg isotope in natural mercury does not contribute substantially to the radiation because of its low concentration, nor does its emission and absorption heavily overlap with the other hyperfine components. Therefore, by increasing its concentration, an additional channel for the 253.7 nm. photons is provided which reduces the average imprisonment time and increases radiation efficiency.

Devices have previously been disclosed to enrich the $^{196}$Hg in mercury feed stocks. In the paper of McDowell et al., "Photochemical Separation of Mercury Isotopes" Can. J. Chem., Vol. 37, 1432 (1959), a disclosure is made of reacting $^{202}$Hg($6^3P_1$) atoms that are contained in natural mercury with hydrogen chloride with a photochemical reaction in which the $^{202}$Hg atoms are excited during the reaction to precipitate an $^{202}$Hg$_2$Cl$_2$.

$$^{202}Hg(6^3P_1) + HCl \rightarrow {}^{202}HgCl + H. \tag{1}$$

As described in a paper by Mark Grossman and Jakob Maya delivered at the International Quantum Electronics Conference, June 1984, very high enrichment of $^{196}$Hg can be achieved in a photochemical reaction using a natural mercury vapor filter. When radiation from a microwave lamp containing mercury enriched to 35% in $^{196}$Hg is used in a filter, the filter eliminates substantially all of the $^{non-196}$Hg component radiation permitting an isotopically selective primary excitation of the $^{196}$Hg isotope. Selective excitation of $^{196}$Hg($6^3P_1$) in natural mercury vapor is obtained by an RF-excited, Hg and rare gas source whose emission is filtered through an atomic vapor filter before it enters into the reaction zone.

The photochemical enrichment of $^{196}$Hg occurs via the reaction:

$$^{196}Hg(6^3P_1) + HCl \rightarrow {}^{196}HgCl + H \tag{2}$$

In the above-referenced papers of Webster et al. and Grossman et al., butadiene (C$_4$H$_6$) was used with HCl as a carrier medium for the feedstock Hg in order to mix with and transport the Hg into the photochemical reaction zone. The use of the butadiene component is due to the following reactions that accompany (1) and (2), above.

$$^{196}Hg(6^3P_1) + HCl \rightarrow {}^{196}Hg(6^1S_O) + H + Cl \tag{3}$$

$$H + HCl \rightarrow H_2 + Cl \tag{4}$$

The free Cl radical reacts in a non-isotope specific way to form $^N$HgCl, i.e.

$$^NHg(6^1S_O) + Cl \rightarrow {}^{NM}HgCl \tag{5}$$

where M designates a third body or surface, and N represents any Hg isotope. Comparing Equations (2) and (5), one sees that the reaction product isotope specificity is "scrambled" due to reaction (5). Butadiene was thought to significantly reduce the rate of Equation (5) and therefore increase the product enrichment. This rate reduction of Equation (5) is thought to occur via a polymerizing reaction in which the H and/or Cl are attached to the C$_4$H$_6$ via saturation of the multiple bonds in C$_4$H$_6$, thereby reducing the rate of (5).

While high enrichments can be achieved using C$_4$H$_6$, three major problems exist with the use of C$_4$H$_6$. First, C$_4$H$_6$ has a relatively high cost. Second, polymerized C$_4$H$_6$ compounds are difficult to remove from the effluent which further prevents maintaining a relatively low contamination level in the flow system. Lastly, the quenching rate of $^{196}$Hg($6^3P_1$) by butadiene is relatively high.

The relatively high quenching rate may explain the low utilization factor achievable with the use of butadiene. A carrier gas which would increase the utilization factor and which reduces the contamination of the effluent would be desirable.

SUMMARY OF THE INVENTION

In accordance with the present invention there is provided a photochemical process for $^{196}$Hg enrichment comprising entraining mercury including $^{196}$Hg isotope in a carrier medium comprising argon and HCl; and exposing the entrained mercury including $^{196}$Hg isotope in the carrier medium to 253.7 nm light to form a quantity of $^{196}Hg_2Cl_2$.

BRIEF DESCRIPTION OF THE DRAWINGS IN THE DRAWINGS:

FIG. 1 graphically represents the $^{196}Hg$ Enrichment Factor as a function of the total pressure in a reaction vessel for a preferred embodiment of the present invention including a carrier medium including argon and HCl at a total flow rate of 200 SCCM.

For a better understanding of the present invention, together with other and further objects, advantages and capabilities thereof, reference is made to the following disclosure and appended claims in connection with the above-described drawings.

DETAILED DESCRIPTION

The present invention is directed to an improved photochemical process for $^{196}Hg$ enrichment. The present method results in an improved mercury feedstock utilization, that is, a greater amount of $^{196}Hg$ isotope is removed from the feedstock of mercury using the present method than is removed by a method which utilizes butadiene. The method of the present invention comprises entraining a feedstock of mercury including $^{196}Hg$ isotope in a carrier medium. The carrier medium comprises argon and HCl. The carrier medium and the feedstock of mercury entrained therein are exposed to 253.7 nm light. The 253.7 nm light causes at least some of $^{196}Hg$ isotope included in the mercury feedstock to react with hydrogen chloride and form $^{196}HgCl$. While not wishing to be bound by theory, the $^{196}HgCl$ radicals are believed to combine on the reactor wall to form $^{196}Hg_2Cl_2$. The $^{196}Hg_2Cl_2$ is isolated from the feedstock by deposition on the reactor chamber walls.

In the present method, argon is used in place of butadiene as the carrier gas. The use of argon as the carrier gas has unexpectedly proved to be very effective in increasing the utilization factor. The use of argon further eliminates the cleaning procedures associated with removing butadiene and its by-products from the mercury feedstock. This advantage permits introduction of automated processing into the flow system.

Figure 1:
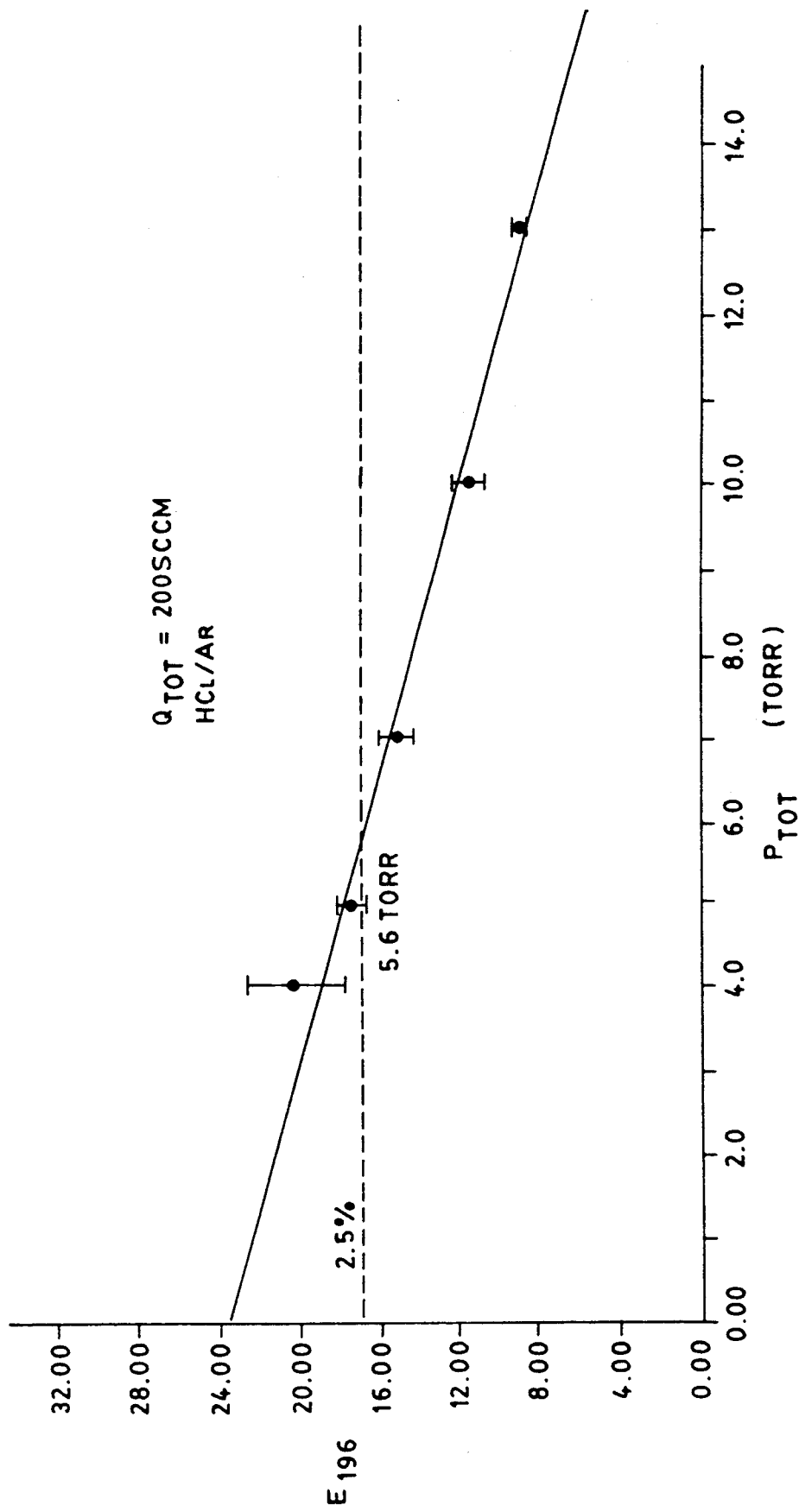

FIG. 1 graphically shows the enrichment factor, $E_{196}$, obtained for different total pressures of the carrier medium given a total flow rate of 200 standard cubic centimeters per minute (SCCM) for a process employing a carrier gas medium containing 100 SCCM HCl and 100 SCCM argon. In FIG. 1, the broken line at $E_{196}$ equal to about 17 represents the minimum $^{196}Hg$ enrichment for use in fluorescent lamps.

As in the case of a process using an HCl/butadiene carrier medium, a process in accordance with the present invention exhibits increasing $E_{196}$ as the total pressure decreases. However, in the case of a butadiene carrier gas, the highest enrichment reactor obtained is about 47 while for HCl/Ar the highest possible enrichment factor obtainable is about 24 (extrapolation of $E_{196}$ versus $P_{TOT}$ to $P_{TOT}=0$).

The enrichment factor, $E_{196}$, is represented by the following expression:

$$E_{196} = \frac{^{196}Hg \text{ conc. (Atomic Weight Percent)}}{0.146}$$

The process of the present invention is particularly well suited for use in a single pass apparatus. When used in a single pass apparatus, the use of an argon carrier gas is very effective in increasing the utilization factor while obtaining single pass enrichment levels sufficient for use in fluorescent lamps as described in U.S. Pat. No. 4,379,252 issued to Work et al.

Preferably, the process of the present invention is carried out in a single pass apparatus such as that described in copending application Ser. No. 947,217, U.S. Pat. No. 4,789,784, entitled "Apparatus for Isotopic Alteration of Mercury Vapor" by Mark Grossman et al. The apparatus or system described therein is described in further detail below. The apparatus includes a single pass reaction vessel which surrounds a filter; the filter in turn surrounds a low pressure electric discharge device having a fill comprising mercury and an inert gas. All of the elements of the system are formed of a material, e.g., quartz, which is transparent to 253.7 nm radiation.

The filter is disposed around the discharge tube and is formed of a pair of concentric cylindrical (or tubular) members that are sealed from the atmosphere at their ends. The filter contains a fill of mercury which is preferably depleted in $^{196}Hg$, and most preferably mercury including less than about 0.07 atomic weight percent) at a pressure of between about 6 to 24 millitorrs. Hydrogen is also included in the fill of the filter and is maintained at a pressure of between about 7 to 13 torrs. The concentric cylinders are preferably sealed at their ends with a pair of spaced-apart end members, so as to form a cylinder with an axial passageway that receives the low pressure discharge device. A means for controlling mercury pressure in the filter is in operational communication with the filter. One example of a mercury pressure controlling means includes a tube, sealed at one end and open to the interior of the filter at the other, which is disposed on the lower end member. A bead of mercury, having a weight of, for example, 10 to 20 milligrams, is disposed in the sealed end of the tube so that its vapors are in communication with the interior of the filter.

Optionally, the apparatus further includes a means for maintaining the mercury in the filter at a predetermined temperature. An example of such temperature maintaining means suitable for use with the foregoing example of a mercury vapor controlling means includes a heat exchanger disposed around the outside of the end of the tube and the bead of mercury so as to maintain the mercury at a predetermined temperature. Preferably, this heat exchanger is a sleeve with an inlet port and an outlet port, and having a pump and a temperature controller disposed on the line to control the temperature of the mercury bead, whereby to maintain a predetermined amount of mercury vapor in the filter.

The reactor is disposed about the filter and may take the form of a pair of concentric cylinders with an inlet and outlet port through which the mercury feedstock and HCl can flow. The exciting $^{196}Hg$ radiation passes through the lamp envelope and through the filter and into the reactor to produce an isotopic specific reaction to the $^{196}$Hg in the reaction vessel, whereby $^{196}$Hg$_2$Cl$_2$ is formed.

In a preferred embodiment of the apparatus, a "T" is disposed on the tube at a location between the filter and the end of the tube. The "T" can be used to make gross changes in the gas pressure in the filter.

Figure 2:
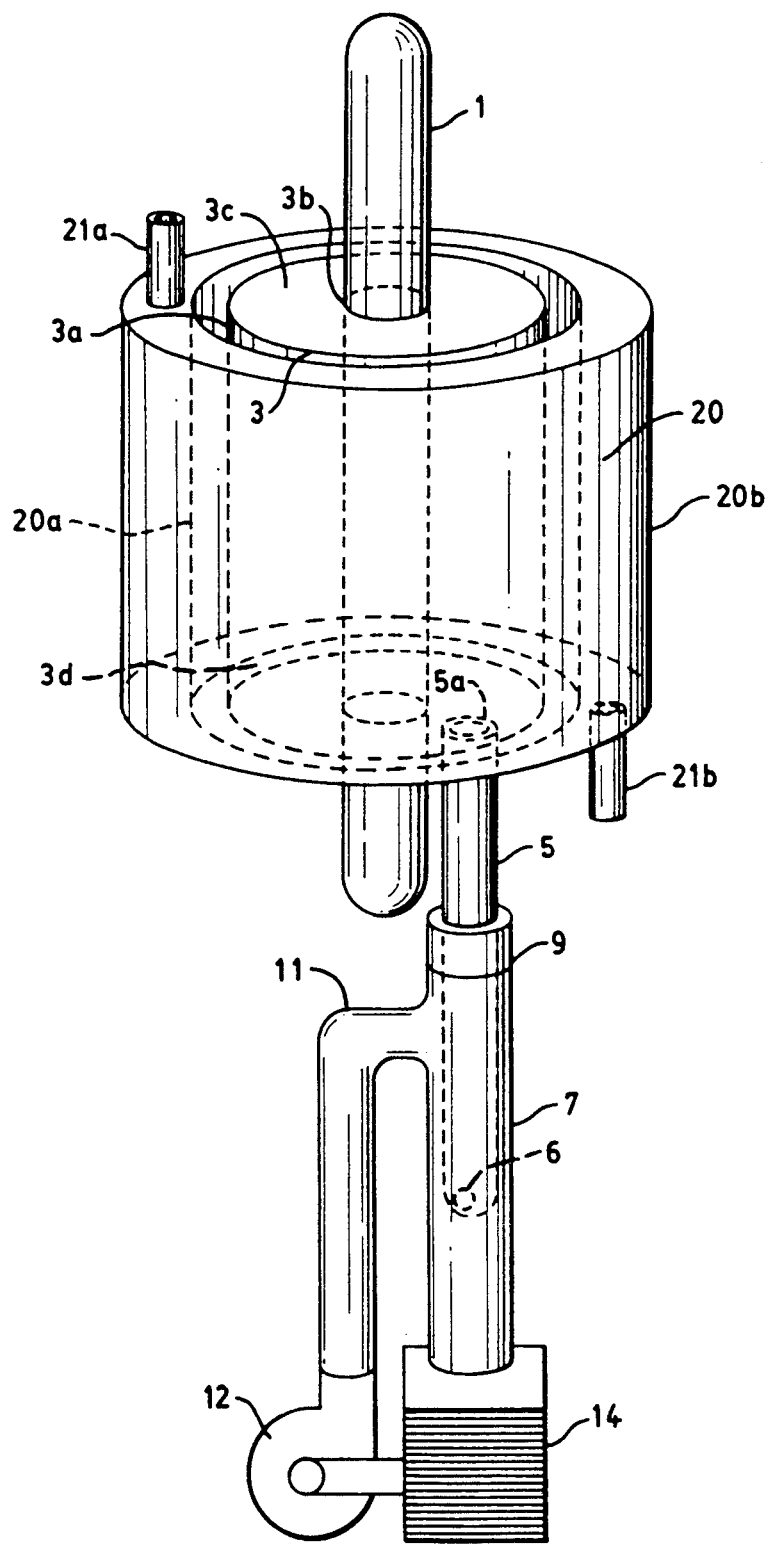
FIG. 2 is a perspective view of a single pass apparatus suitable for use with the method of the present invention.

Referring to FIG. 2, there is shown as single pass apparatus including a low pressure mercury lamp 1 comprising a silica or quartz discharge tube to one end of which a microwave cavity is connected. For isotope separation of $^{196}$Hg, the inner diameter of the tube in a preferred embodiment is preferably about 5 mm. The discharge lamp 1 typically includes argon at a pressure of approximately 2.5 torr and a mercury pressure of approximately 1 to 1.5 millitorr at about 20° C. Although argon is the preferred starting gas in the lamp, other inert gases such as neon may alternatively be used.

The flow rate of the carrier medium into the reactor strongly affects the rate of product formation, the formation rate being proportional to the flow rate. The flow rate is limited by the pump speed and the conductance of the system. Flow rates of, for example, from about 10 to about 10$^4$ sccm can be used for the carrier medium.

The filter 3 includes a pair of concentric cylindrical members 3a and 3b. Preferably, the concentric cylindrical members are spaced from each other at a distance of about 1.0 centimeter. The filter 3 is sealed from the atmosphere by a seal means. In FIG. 2, the seal means comprises a pair of spaced apart end members 3c and 3d that are fused to the ends of the concentric cylindrical members 3a and 3b. An axial passageway is formed in the filter 3 by the inner cylindrical member 3b and is arranged to receive the lamp 1.

The single pass apparatus further includes a means for controlling mercury pressure within the filter. In the apparatus shown in FIG. 2, the means for controlling mercury pressure in the filter includes a tube 5, sealed at one end, and in communication with the interior of the filter 3 through port 5a is sealed to and projects from the lower end member 3d sealed to the concentric members 3a, 3b. A bead of mercury 6 is disposed at the closed end of the tube 5 and arranged so as to be in communication with the interior of the filter 3. Optionally, the means for controlling mercury pressure further comprises means for maintaining the mercury at a predetermined temperature. In the illustrated apparatus, the mercury temperature maintaining member comprises a sleeve 7 disposed about the end of the tube 5 and around the bead of the mercury 6. A sealing ring 9, such as a conventional O-ring, is disposed between the sleeve 7 and the tube 5 to hold the sleeve 7 in place and prevent leakage of heat exchange fluid (preferably water) which passes through the sleeve 7. The heat exchange fluid flows through a "T" connection 11, down sleeve 7 into heater 14 and thence to pump 12 to return to "T" 11. Pump 12 and heater 14 maintain the temperature of the tube at a predetermined level, so as to control the mercury vapor pressure in the filter. This control permits a predetermined quantity of mercury vapor to be maintained in the filter.

The reactor 20 is disposed around the filter 3 and includes a pair of spaced-apart concentric sleeves 20a and 20b. A conventional inlet and outlet port 21a and 21b are disposed on the top and bottom of the reactor 20 to allow for the passage of mercury feedstock.

The filter 3 is filled with a mixture including mercury vapor and hydrogen or nitrogen gas. Preferably the mixture in the filter includes hydrogen gas. Most preferably, the mercury used in the filter has a reduced $^{196}$Hg content as disclosed in co-pending application filed concurrently herewith, Ser. No. 947,216 entitled "Filter For isotopic Alteration of Mercury Vapor" of M. Grossman et al.

Figure 3A:
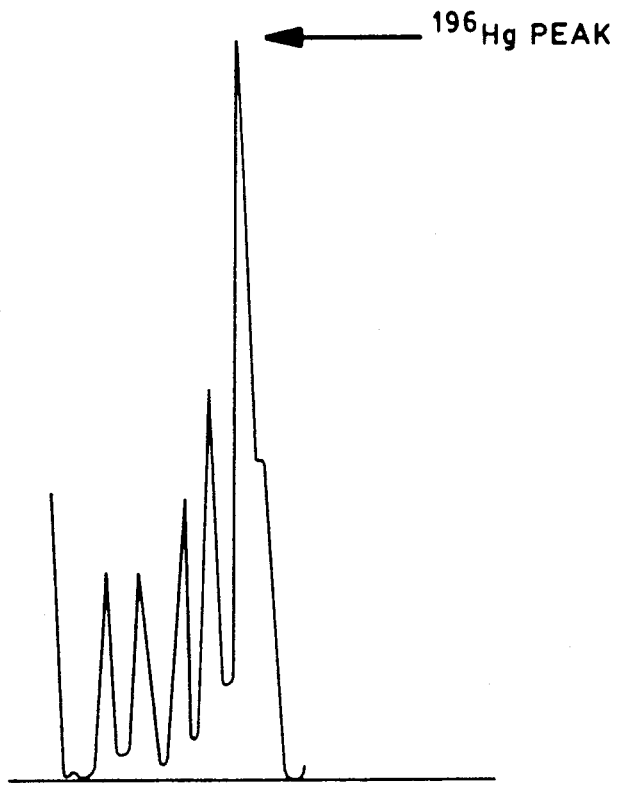
FIGS. 3A and 3B are curves illustrating the relevant portions of the spectral energy distribution curves of, respectively, the emission of a typical low pressure lamp and the emission after the light has passed through the filter of the present invention.
Figure 3B:
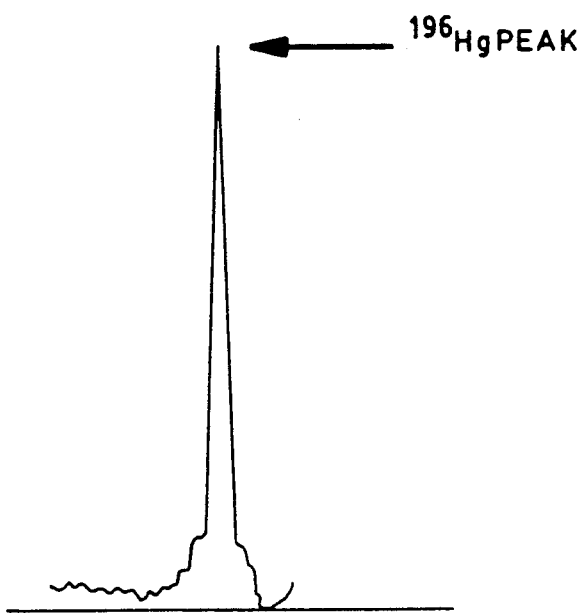

Turning to FIGS. 3A and 3B, it can be seen in FIG. 3A that the Hg (6$^3$P$_1$-6$^1$S$_O$), viz, $^{196}$Hg, has many observable hyperfine emission peaks to the left of the principal peak. In FIG. 3B, the hyperfine emissions to the left of the principal emission peak are suppressed in the emissions which were measured after the radiation passed through the above-described filter, thereby improving the efficiency of the photochemical reaction process.

A series of experiments was conducted to compare the method of the present invention with a method utilizing a C$_4$H$_6$ carrier gas. The experiments were carried out using a single pass apparatus similar to that shown in FIG. 2. In Experiments 1 through 6 the filter included 10 mg of naturally occurring mercury (including about 0.146 weight percent $^{196}$Hg). In Experiment 7, the filter included 10 mg Hg containing less than 0.146 weight percent $^{196}$Hg. In experiments 1 through 3, the filter was operated at a temperature of about 40° C. In experiments 4 through 7, the filter was operated at a temperature of about 50° C. The low pressure mercury vapor discharge lamp in each of the experiments had a cold spot temperature of about 20° C.

In accordance with the present invention a feedstock of mercury including 0.146 weight percent $^{196}$Hg was entrained in a carrier medium. In experiments 1 through 3 the carrier medium was a mixture of 100 standard cubic centimeters per minute (SCCM) of carrier gas and 100 SCCM of HCl. In Experiments 4 through 7 the carrier gas flow rate was 70 SCCM and the HCl flow rate was 100 SCCM. The carrier medium with the mercury feedstock entrained therein was passed through the reactor vessel at a flow rate of 10 mg of mercury feedstock per hour.

The results of the seven experiments conducted to compare the method of the present invention utilizing an argon carrier gas with a method utilizing a butadiene carrier gas are summarized in the following Table.

TABLE

| Expt No. | Carrier Gas | Total Reactor Pressure (Torr) | Flow Rate (mg/hr) | Enrichment Factor | Util. Factor | $Y_{mg/hr}$ |
|---|---|---|---|---|---|---|
| 1 | C$_4$H$_6$ | 2 | 13 | 47 | 0.09 | 0.020 |
| 2 | C$_4$H$_6$ | 4 | 6 | 25 | 0.09 | 0.027 |
| 3 | C$_4$H$_6$ | 10 | 4 | 13 | 0.31 | 0.028 |
| 4 | Argon | 4 | 13 | 18 | 0.40 | *N.M. |
| 5 | Argon | 10 | 9 | 11 | 0.70 | 0.51 |
| 6 | Argon | 7 | 22 | 17 | 0.51 | 0.36 |
| 7 | Argon | 10 | 19 | 5 | 0.64 | 1.1 |

*N.M. = not measured

In the foregoing Table, the column labeled "$Y_{mg/hr}$" represents the rate of $^{196}$Hg$_2$Cl$_2$ product formation in milligrams per hour.

While there has been shown and described what are considered preferred embodiments of the present invention, it will be obvious to those skilled in the art that various changes and modifications may be made therein without departing from the invention as defined by the appended claims.

What is claimed is:

1. A photochemical process for $^{196}$Hg enrichment comprising:
   entraining mercury feedstock including $^{196}$Hg isotope in a carrier medium formed of argon and HCl;
   exposing the mercury feedstock including $^{196}$Hg isotope entrained in the carrier medium to 253.7 nm light to form a quantity of $^{196}$Hg$_2$Cl$_2$.

2. A photochemical process in accordance with claim 1 further comprising isolating the quantity of $^{196}$Hg$_2$Cl$_2$ from the mercury feedstock.

3. A photochemical process for $^{196}$Hg enrichment comprising:
   entraining mercury feedstock including $^{196}$Hg isotope in a carrier medium formed of argon and HCl;
   passing the mercury feedstock entrained in the carrier medium into a reactor vessel of a single pass apparatus, including the reactor vessel, said mercury feedstock entrained in the carrier medium; and
   exposing the mercury feedstock entrained in the carrier medium within the reactor to 253.7 nm light to form a quantity of $^{196}$Hg$_2$Cl$_2$.

4. A photochemical process in accordance with claim 3 wherein carrier medium is formed of from about 10 to $10^4$ SCCM argon and from about 10 to $10^4$ SCCM HCl.

5. A photochemical process in accordance with claim 3 wherein said mercury feedstock entrained in the carrier medium is at a total pressure of from about 0.1 to about 10 Torr in the reactor vessel.

* * * * *

UNITED STATES PATENT AND TRADEMARK OFFICE
CERTIFICATE OF CORRECTION

PATENT NO. : 5,061,353

DATED : October 29, 1991

INVENTOR(S) : Mark W. Grossman

It is certified that error appears in the above-identified patent and that said Letters Patent is hereby corrected as shown below:

On the title page:

Column 1, [75] Inventor: Mark W. Grossman

Signed and Sealed this

Ninth Day of March, 1993

*Attest:*

STEPHEN G. KUNIN

*Attesting Officer*  *Acting Commissioner of Patents and Trademarks*